US012333053B2

(12) United States Patent
Ananthanarayanan et al.

(10) Patent No.: US 12,333,053 B2
(45) Date of Patent: *Jun. 17, 2025

(54) PRIVACY TRANSFORMATIONS IN DATA ANALYTICS

(71) Applicant: Microsoft Technology Licensing, LLC, Redmond, WA (US)

(72) Inventors: Ganesh Ananthanarayanan, Seattle, WA (US); Landon Prentice Cox, Seattle, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,316

(22) Filed: Sep. 28, 2023

(65) Prior Publication Data

US 2024/0104248 A1    Mar. 28, 2024

Related U.S. Application Data

(63) Continuation of application No. 17/360,552, filed on Jun. 28, 2021, now Pat. No. 11,822,698.

(51) Int. Cl.
*G06F 21/00* (2013.01)
*G06F 21/62* (2013.01)
*G16Y 40/50* (2020.01)

(52) U.S. Cl.
CPC ...... *G06F 21/6263* (2013.01); *G06F 21/6254* (2013.01); *G16Y 40/50* (2020.01)

(58) Field of Classification Search
CPC .. G06F 21/6263; G06F 21/6254; G16Y 40/50
See application file for complete search history.

(56) References Cited

U.S. PATENT DOCUMENTS

2011/0283343 A1* 11/2011 Jaeger .................. H04L 63/30
709/224
2012/0063595 A1* 3/2012 Massoudi ........ H04N 21/23476
380/210

(Continued)

OTHER PUBLICATIONS

Communication under Rule 71(3) Received for European Application No. 22729927.8, mailed on Nov. 19, 2024, 07 pages.

(Continued)

*Primary Examiner* — Ghazal B Shehni

(57) ABSTRACT

Systems and methods are provided for performing privacy transformation of data to protect privacy in data analytics under the multi-access edge computing environment. In particular, a policy receiver in an edge server receives privacy instructions. Inference determiner in the edge server in a data analytics pipeline receives data from an IoT device and evaluates the data to recognize data associated with personally identifiable information. Privacy data transformer transforms the received data with inference for protecting data privacy by preventing exposure of private information from the edge server. In particular, the privacy data transformer dynamically selects a technique among techniques for removing information that is subject to privacy protection and transforms the received data using the technique. The techniques includes reducing resolution of image data such that inference enables object recognition without sufficient details to prevent other servers in the data analytics pipeline to determine identifies of the object deeper inferences.

20 Claims, 9 Drawing Sheets

(56) References Cited

U.S. PATENT DOCUMENTS

2013/0097432 A1* 4/2013 Cerruti ................. G06F 21/602
713/190
2021/0174155 A1* 6/2021 Smith ................... G06F 18/211

OTHER PUBLICATIONS

Decision to grant a European patent pursuant to Article 97(1) Received for European Application No. 22729927.8, mailed on Feb. 27, 2025, 02 pages.

* cited by examiner

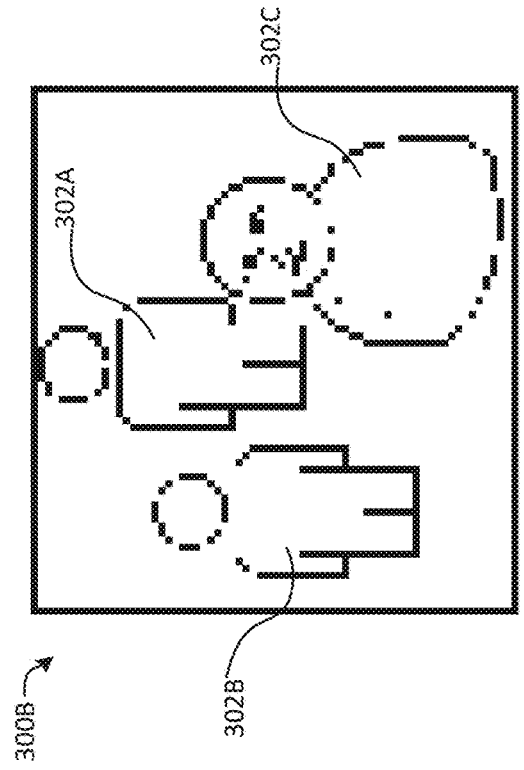
FIG. 3A
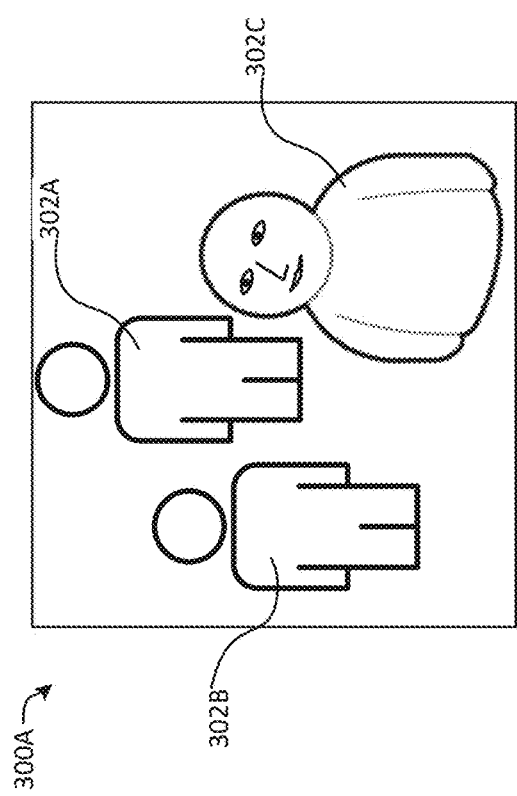
FIG. 3B
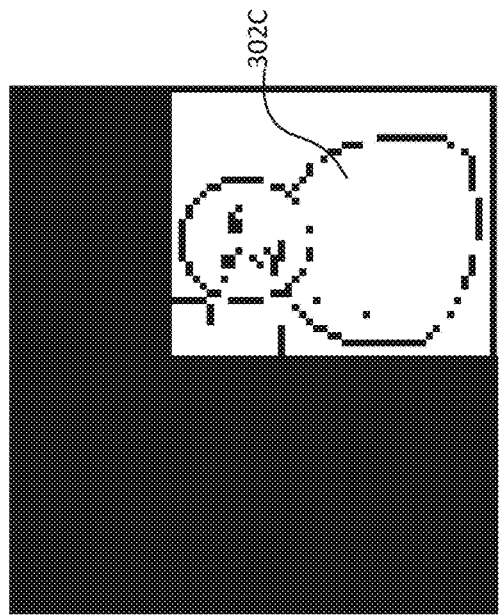
FIG. 3C
A number of front-facing people = 1
FIG. 3D

PRIVACY TRANSFORMATIONS IN DATA ANALYTICS

CROSS-REFERENCE TO RELATED APPLICATIONS

This application is a continuation application of U.S. patent application Ser. No. 17/360,552, filed on Jun. 28, 2021, the entire disclosure of which is hereby incorporated by reference in its entirety.

BACKGROUND

With the advent of 5G, Multi-access Edge Computing (MEC) with data analytics pipelines has become important to improve performance of cloud services. In MEC, there is a hierarchy of devices and servers. For instance, Internet-of-Things (IoT) devices, e.g., cameras of personal or commercial security systems, municipal traffic cameras, and the like, capture and transmit stream data (e.g., video data) to cell towers. The cell towers relay the stream data to edge servers in on-premises (i.e., "on-prem") edges as uplink data traffic. The on-premises edge servers transmit the uplink data traffic to network servers at network edges of a cloud infrastructure, and the network servers further transmit the uplink data traffic to cloud servers for processing.

Due to physical constraints (both dimensional and geographic), the edge servers at the on-premises edges have limited computing power and memory capacity when compared to the cloud servers because the edge servers are geographically distributed at locations proximal to the cell towers. It is cost-prohibitive and/or physically infeasible to install extensive computing resources at the edge servers, but transmitting the raw uplink data to the cloud via a radio access network (RAN) falls short of meeting real-time data processing needs and involves significant bandwidth utilization. As a result, some processing is performed at on-premises edge servers, including limited analytics tasks on data streams (e.g., video, audio, images) captured by Internet of Things (IoT) devices. The data analytics include object recognition (e.g., recognizing a person or a thing appearing on a video stream) based on trained models. For example, a service application may use one trained model for identifying a person and another trained model for identifying an automobile in a video stream.

The on-site IoT devices and the servers associated with MEC form a hierarchy that reflects a spectrum of varying levels of trustworthiness (i.e., levels of trust) in protecting data privacy from the customers' perspective. In particular, the IoT devices themselves typically are the most trusted because the customers often own and/or control these devices. The cell towers and the on-premises edge servers may be next in the spectrum of trustworthiness because the telecommunications network operators may manage the cell towers and the on-premises edge servers. The level of trustworthiness (i.e., level of trust) of network edge servers may depend on whether the telecommunications network operators or a cloud service manages the network edge servers. From the perspective of the customer, cloud servers may be the least trustworthy (i.e., the lowest level of trust).

In aspects, video analytics may refer to processing video data captured by IoT devices (e.g., video cameras or other image-capturing devices) to make a series of inference determinations. The inference determinations are often made using machine learning based on trained models, which require loading parameters into a graphics processing unit (GPU) and reserving enough memory space for training data and any intermediate data that is generated during inference execution of the model. The inference determinations require intensive computing and/or memory resources. Traditional video analytics systems in MEC allocate video analytics processing based on an availability of computing and memory resources in respective devices and/or servers in the video analytics pipeline. For example, IoT devices such as video cameras, which often have the most limited computing and memory resources, may merely capture video stream data. On-premises edge servers may process the captured video frames in a very limited manner (e.g., region of interest recognition); whereas cloud servers with robust computing and memory resources may perform the most computing-intensive video analytics in the MEC. However, this allocation of resources may involve transmitting raw or minimally processed customer video data to the cloud—without considering privacy vulnerabilities and/or breaches of confidentiality. In this case, since video data may include "Personally (or Personal) Identifiable Information" (PII) or other confidential matters, the present disclosure describes processing this data by devices or servers in proximity or control of the customer (e.g., at a high level of trust) before transmission across potentially public networks with an increased chance of PII exposure (e.g., at a low level of trust). In aspects, the term "Personally (or Personal) Identifiable Information (PII)" refers to any data that can be used to identify a specific person as an individual. The term "confidential subject matter" refers to any data that is subject to protection as confidential (e.g., classified documents, trade secrets, internal company memoranda, financial documents or spreadsheets, manufacturing/engineering specifications or designs, and the like).

Accordingly, there arises a tension between computing/memory resources allocation and privacy considerations at each level of the hierarchy in MEC. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to implementing privacy transformations in data analytics (e.g., video analytics) in multi-access edge computing (MEC) systems. As noted above, the MEC involves a hierarchy of data centers and servers with a spectrum of varying levels of trustworthiness in terms of data privacy protections. In aspects, the system retrieves a policy associated with protecting data privacy at an on-premises edge server. When the on-premises edge server receives video stream data (e.g., from a video camera over a RAN), the on-premises edge server performs inference determinations on the video stream data based on the privacy policy and/or confidentiality policy. For example, based on the privacy policy, the on-premises edge server may dynamically select a technique for transforming the video stream data to protect data privacy during transmission to cloud servers, where additional video analytics may be performed. In aspects, transformation of the video stream data has none or a minimal impact (e.g., a nominal reduction in inference accuracy) on the video analytics performed on the cloud servers. In other aspects, other trusted devices (e.g., the IoT device and/or a network edge server) may make inference determinations and transform video stream data to protect data privacy.

The disclosed technology relates to one or more edge servers in an on-premises edge datacenter of a private cloud network that may interface with a radio access network (RAN). In aspects, the term "on-premises edge" may refer to a datacenter at a remote location at the far-edge of a private cloud, which is in proximity to one or more cell towers. The RAN, in combination with a core network of a cloud service provider, represents a backbone network for mobile wireless telecommunications. For example, cell towers may receive and transmit radio signals to communicate with IoT devices (e.g., video cameras) over a RAN (e.g., 5G). Various service applications may perform different functions, such as network monitoring or video streaming, and may be responsible for evaluating data associated with the data traffic. For instance, a service application may perform data analytics, such as object recognition (e.g., object counting, facial recognition, human recognition) on a video stream.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-D illustrate examples of images associated with privacy transformations in accordance with aspects of the present disclosure.

Figure 4:
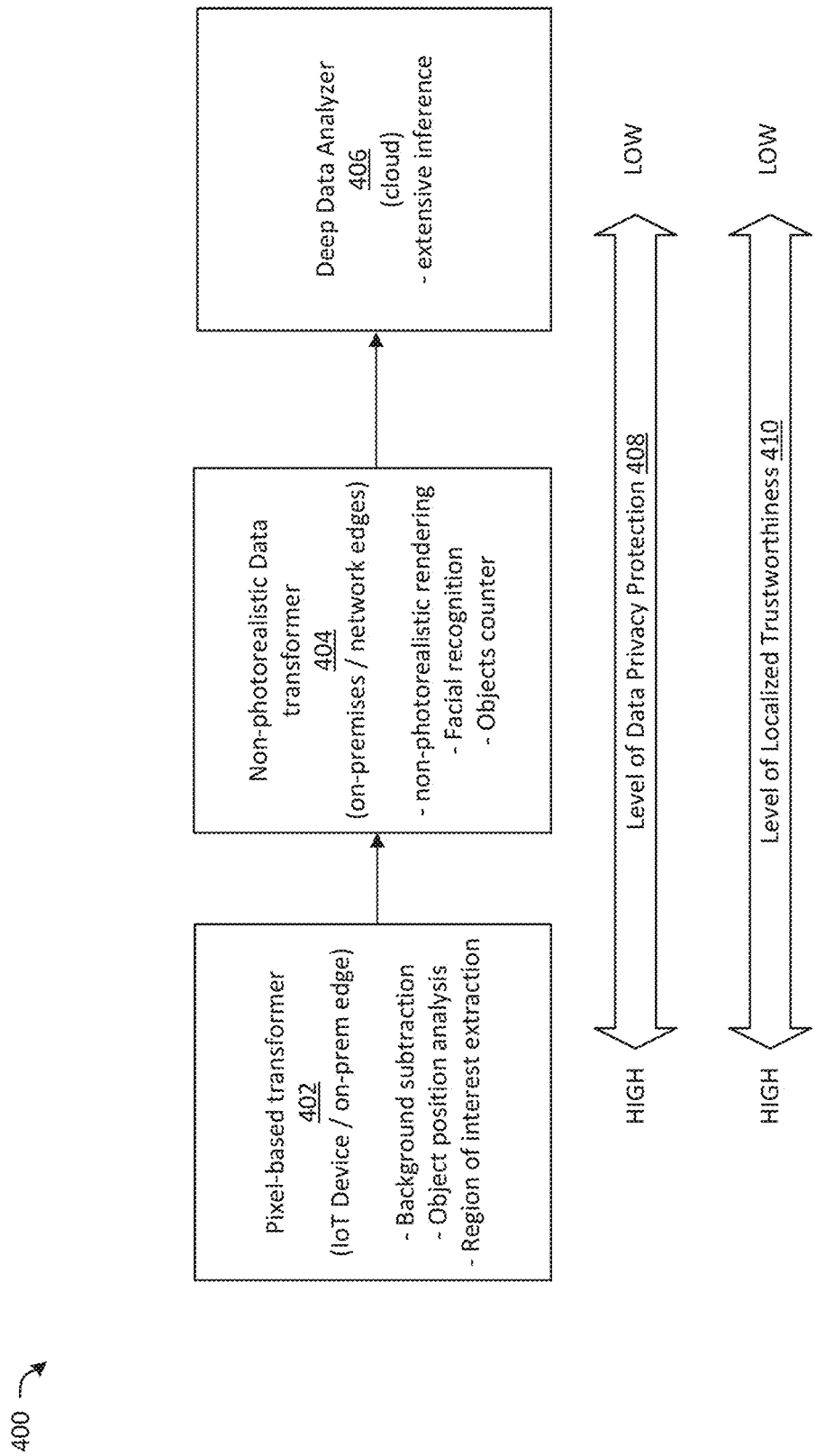

FIG. 4 illustrates an example system for privacy transformation in accordance with aspects of the present disclosure.

Figure 5:
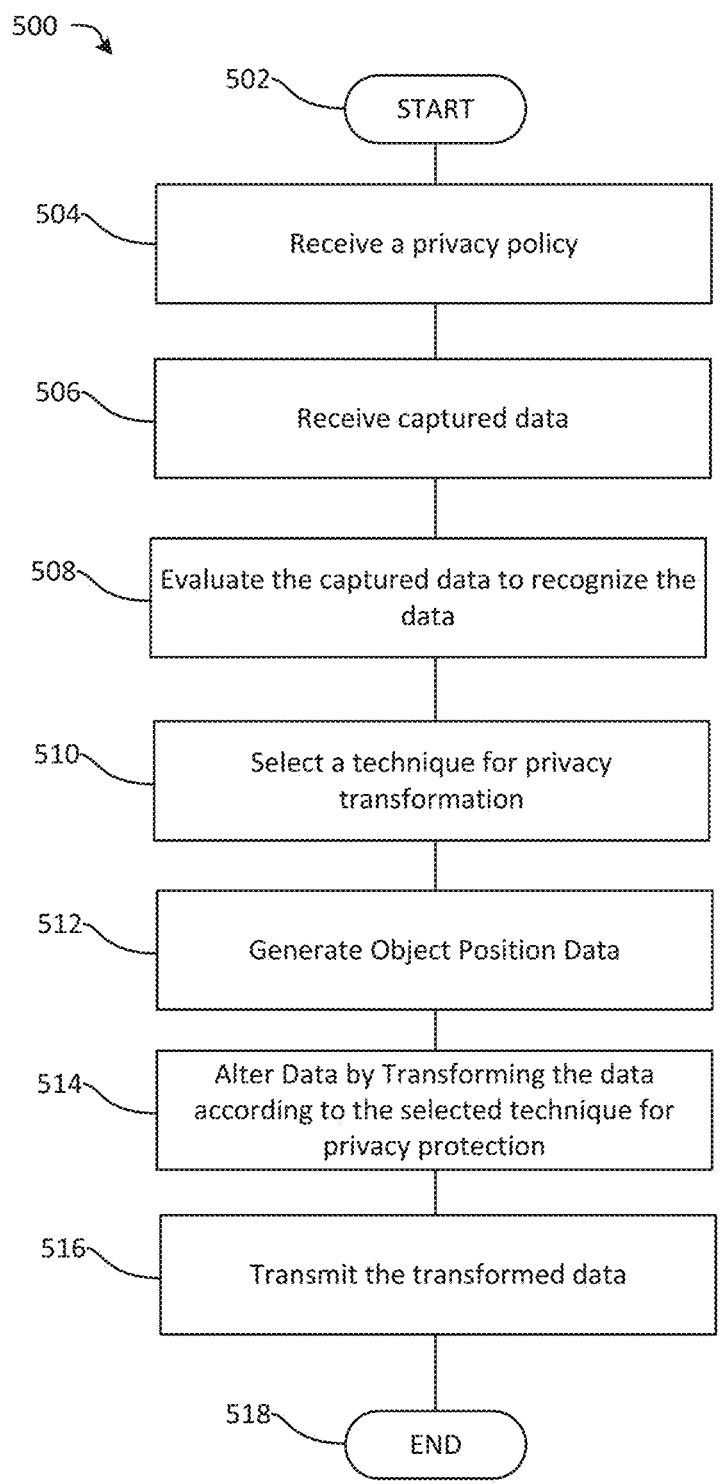

FIG. 5 illustrates an example of a method for privacy transformation in accordance with aspects of the present disclosure.

Figure 6:
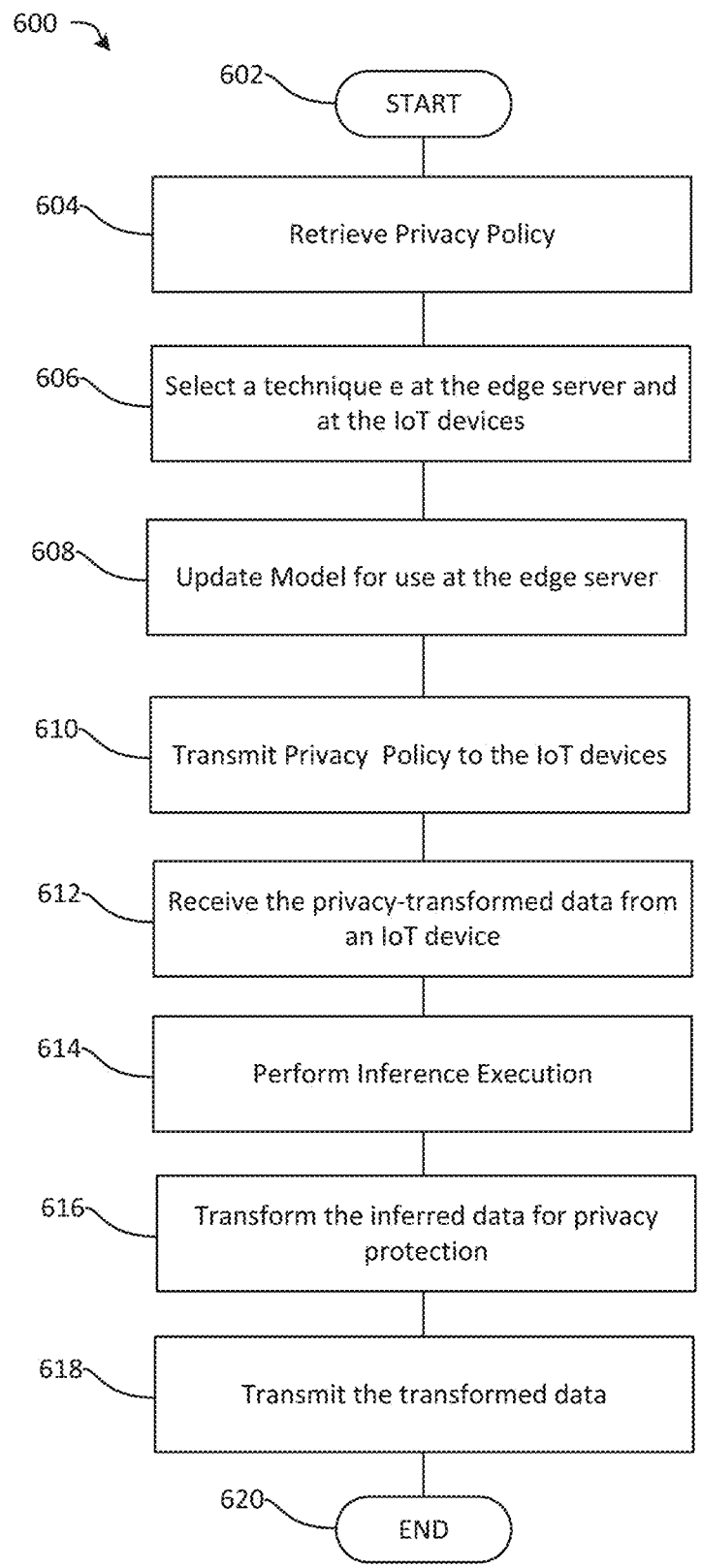

FIG. 6 illustrates an example of a method for privacy transformation in accordance with aspects of the present disclosure.

Figure 7:
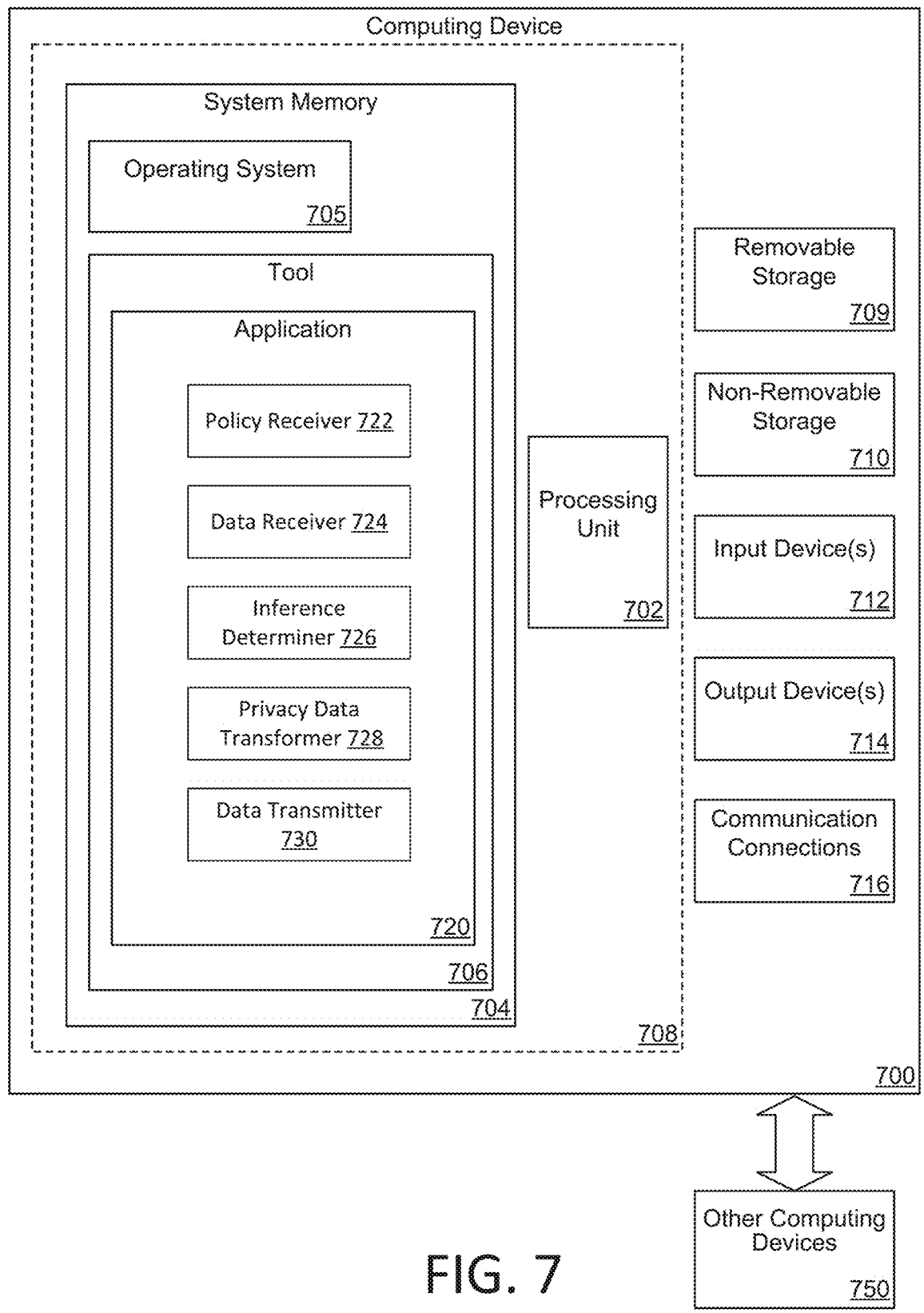

FIG. 7 is a block diagram illustrating example physical components of a computing device with which aspects of the disclosure may be practiced.

Figure 8A:
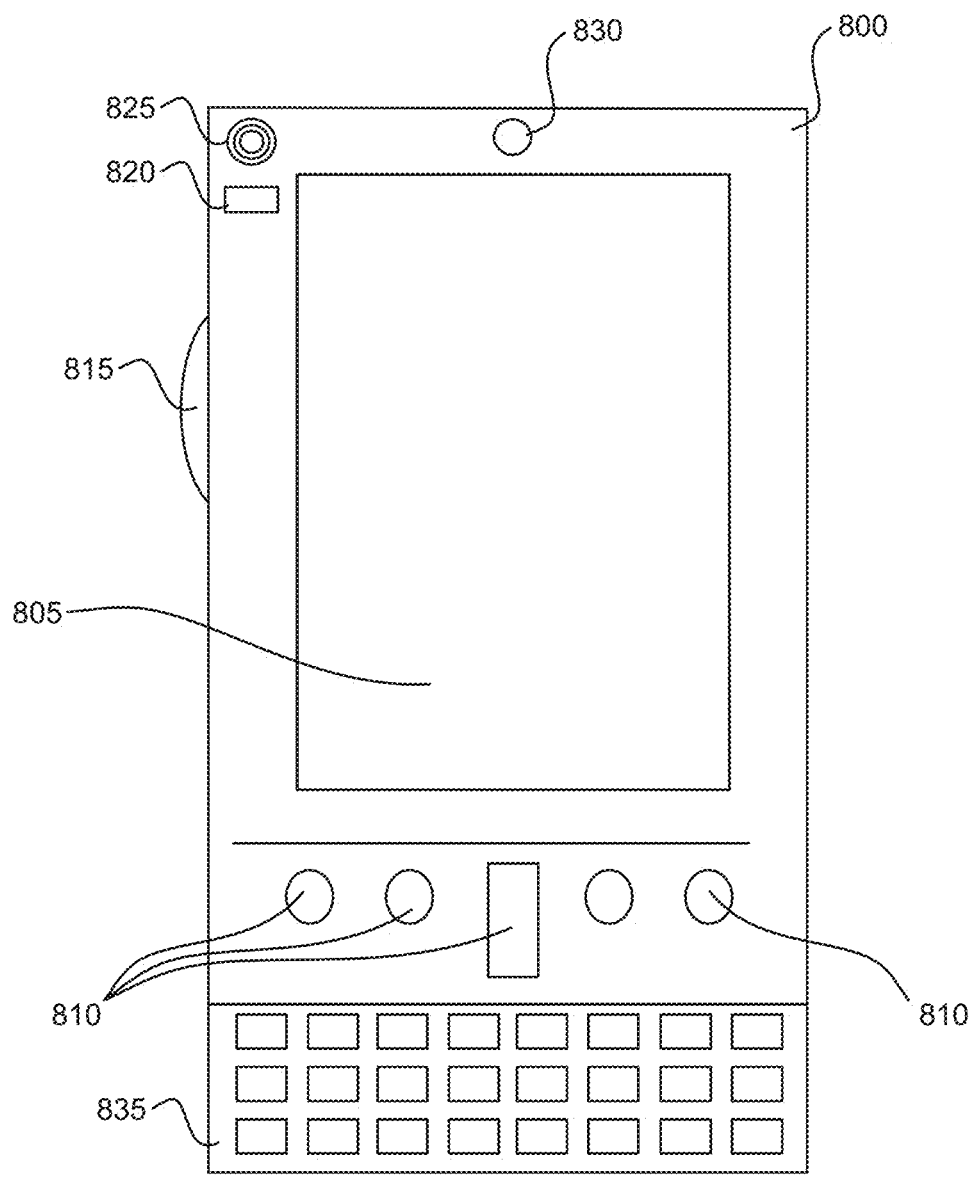

FIG. 8A is a simplified diagram of a mobile computing device with which aspects of the present disclosure may be practiced.

Figure 8B:
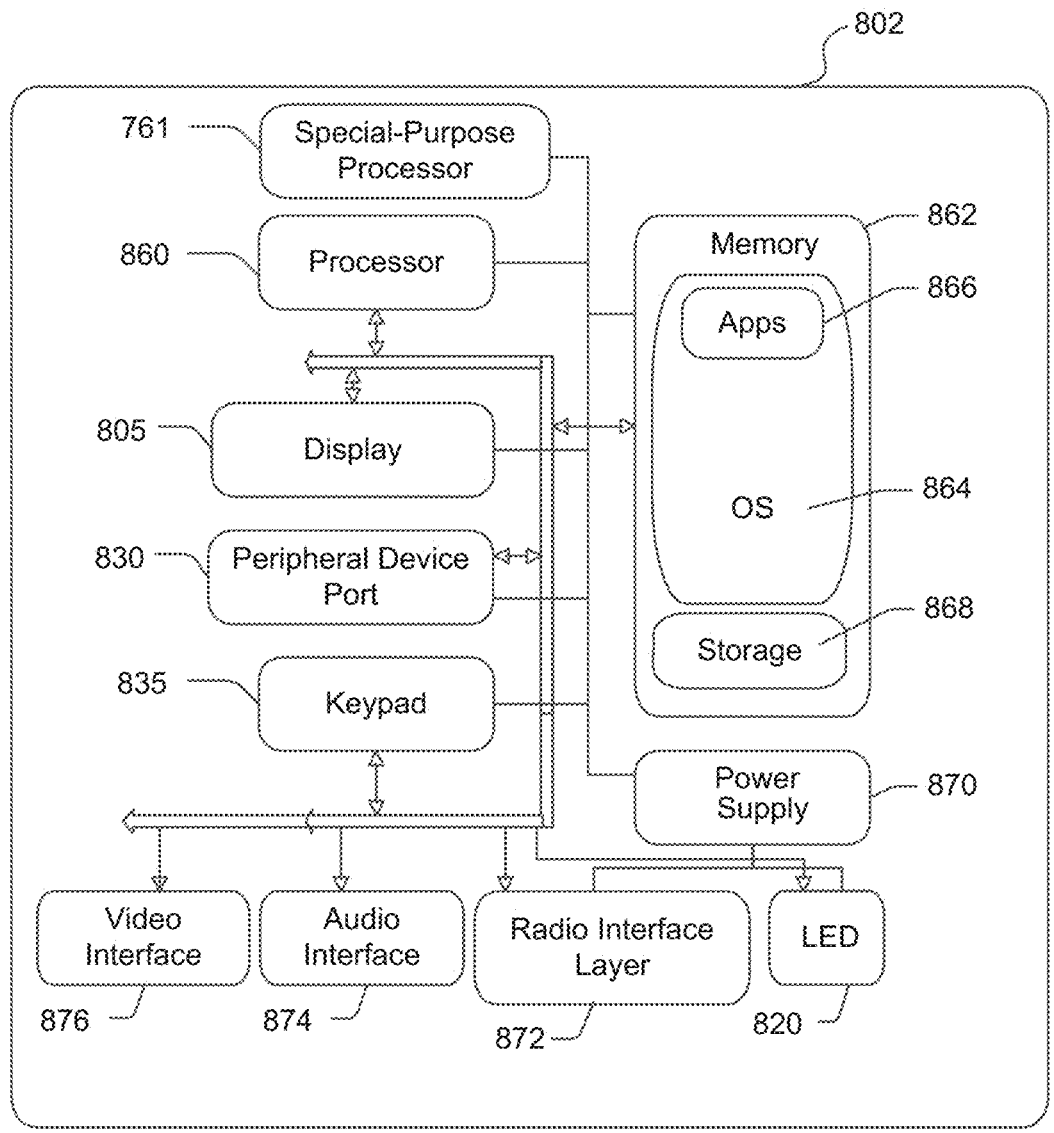

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Wireless telecommunication networks may be implemented by cloud services. In this case, IoT devices may transmit and receive data from cell towers, which may connect via cloud services to a public network (e.g., the Internet) and/or private networks. The cloud service provider may implement a vast array of virtual servers and other computing resources to dynamically scale computing capacity as needed based on the volume of data traffic. To enable real-time processing of data traffic, an on-premises edge server may be relatively close (e.g., a few kilometers) to a cell tower. However, due to the physical and geographical constraints associated with a RAN, the on-premises edge servers may include limited capacity in computing and memory resources as compared to network servers at the network edges and cloud servers in the cloud. Accordingly, the servers form a hierarchical structure with the distributed on-premises edges at the downstream end, the network edges in the middle, and the cloud servers at the root.

From the perspective of trustworthiness for protecting privacy of data, the IoT devices (e.g., video cameras, microphones, heat sensors, and other sensing devices) provide the highest level of trustworthiness (or are at the highest level of trust) for users because users typically own the IoT devices located in the field. Often, it is the users' private and identifying data (such as photos of friends and family, photos of a residence and surrounding geography, etc.) that is captured by the IoT devices and is the object of the privacy concerns. The cell tower and the on-premises edge servers provide the next level down in trustworthiness from the perspective of users. That is, users may trust cellular service providers more than network or cloud service providers because cellular service providers contract directly with the users and operate cell towers (and potentially on-premises edge servers) in relatively close proximity to the users. Servers at the network edges, which receive data conveyed by the on-premises edge servers, may be a combination of locally installed servers in the field and virtual servers in the cloud. These network servers may be associated with yet another level down in trustworthiness (e.g., at a lower level of trust) from the perspective of users by virtue of being one more step removed from the users. The cloud servers, which provide access to public networks such as the Internet, may be even less trustworthy (e.g., at a lower level of trust) and may provide the lowest level of privacy protection for user data. Cloud service providers, which are distinct from the cellular telecommunication operators, may manage and operate the cloud for a broad geographic area based on a vast array of cloud servers and other distributed resources located at regional data centers.

As discussed in more detail below, the present disclosure relates to private transformation in analytics of captured data. Examples of data analytics include video analytics, image analytics, audio analytics, and the like. Typically, application services for data analytics determine inferences of data that are captured by the IoT device and transmitted via uplink.

The limited computing and memory resources of on-premises edge servers execute one or more service applications on the central processing unit (CPU) and/or accelerators such as a graphics processing unit, GPU. The service applications use models to analyze stream data (e.g., video stream data from IoT devices) and create abstract data for further analyses in the cloud. The abstract data may include recognized or predicted object type (e.g., person, dog, tree, etc.) and/or object counts (e.g., three people) based on analytics performed on stream data but may not include the raw data having the PII (e.g., image of a person's face), personally identifying analytics (e.g., facial recognition to identify a specific individual), or confidential subject matter (e.g., an image of confidential designs or machinery in a manufacturing plant).

The disclosed technology addresses the issue of protecting privacy of captured data by dynamically determining technologies for performing privacy transformations on data at various stages of the data analytics pipeline, including by the IoT devices, the on-premises edge, the network edge, and the cloud. For example, the edge server, based on a privacy policy (or privacy instructions), may perform a privacy transformation on a captured video stream by reducing a resolution of the video data. In aspects, the reduced resolution maintains enough data for object recognition and/or object number recognition but not enough data for performing unique object identification (e.g., a unique person based on facial recognition). That is, to prevent exposure of PII and/or confidential subject matter, the reduced resolution may preclude facial recognition analytics or other analytics that may reveal personally identifiable information. The edge server transmits the transformed video stream to servers at a network edge, where the level of trustworthiness is inferior to the level at the edge server. Through privacy transformations, a server eliminates or reduces the risk of exposing PII to another server that is less trusted in the hierarchy of servers in MEC. In aspects, privacy transformations may impact the accuracy of data analytics. However, the data analytics may still be meaningful with a nominal reduction in accuracy.

Figure 1:
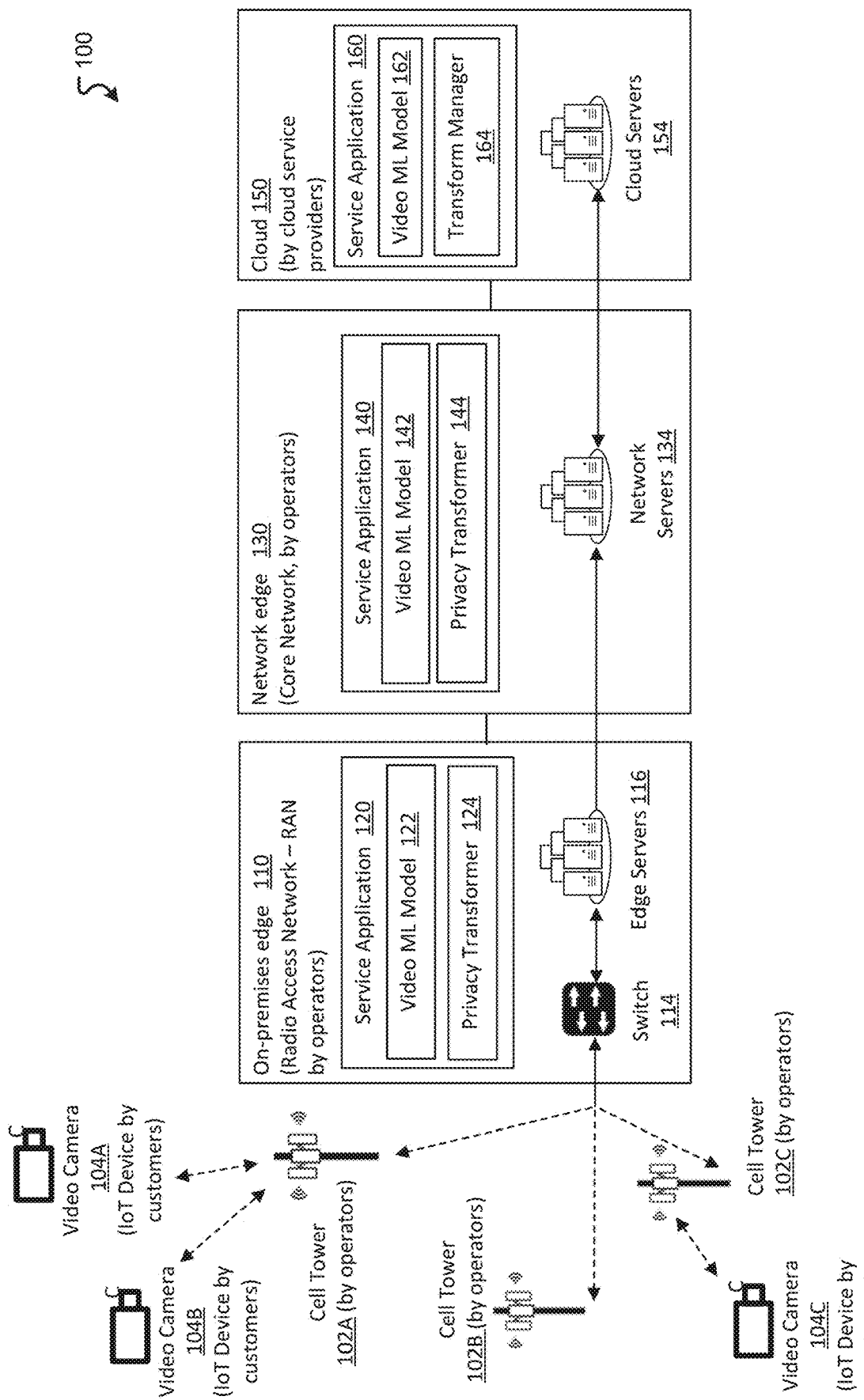
FIG. 1 illustrates an overview of an example system for implementing privacy transformations for data analytics in accordance with aspects of the present disclosure.

FIG. 1 illustrates an overview of an example system 100 for performing privacy transformations on data in a data analytics pipeline in multi-access edge computing in accordance with the aspects of the present disclosure. Cell towers 102A-C transmit and receive wireless communications with IoT devices (e.g., video cameras, health monitors, watches, appliances, etc.) over a telecommunications network. Video cameras 104A-C represent examples of IoT devices communicating with the cell towers 102A-C in the field. In aspects, the video cameras 104A-C are capable of capturing video images and transmitting the captured video images over a wireless network (e.g., the 5G cellular network) to one or more of the cell towers 102A-C. For example, respective video cameras 104A-C may capture scenes for purposes of video surveillance, such as traffic surveillance or security surveillance. The example system 100 further includes an on-premises edge 110 (including switches and edge servers), a network edge 130 (including core network servers), and a cloud 150 (including cloud servers responsible for providing cloud services). In aspects, the example system 100 corresponds to a cloud RAN infrastructure for a mobile wireless telecommunication network.

As illustrated, the on-premises edge 110 is a datacenter that is part of a cloud RAN, which includes service application 120. In aspects, the on-premises edge 110 enables cloud integration with a radio access network (RAN). The on-premises edge 110 includes a switch 114 and edge servers 116. The switch 114 and the edge servers 116 process incoming data traffic and outgoing data traffic. The edge servers 116 execute service applications 120. In aspects, the on-premises edge 110 is generally geographically remote from the cloud datacenters associated with the core network and cloud services. The remote site is in geographic proximity to the cell towers. For example, the proximity in the present disclosure may be within about a few kilometers. In aspects, the upstream data traffic corresponds to data flowing from the cell towers 102A-C to cloud servers 154 in the cloud 150 (service). Similarly, the downstream data traffic corresponds to data flowing from the cloud 150 (service) to the cell towers. In further aspects, regional datacenters that support the cloud 150 may serve a broad geographic area and the cloud server resources (including processing units and memory) may be more robust and powerful than edge servers 116 and network servers 134. As an example, cloud servers 154 may be more powerful than network servers 134 and edge servers 116, which may be more powerful than the edge servers 116. Conversely, the closer a datacenter is to connected devices (e.g., IoT devices), the more trusted the datacenter may be. In this case, edge servers 116 are more trusted than network servers 134, which are more trusted than cloud servers 154.

In aspects, the network edge 130 (e.g., hosting the core network) includes service application 140, which may perform video analytics and/or video transformations. In aspects, the network edge 130 includes servers that are geographically located at a regional datacenter of a private cloud service. For example, the regional datacenter may be about tens of kilometers from the cell towers 102A-C. In aspects, the network servers 134 may include virtual servers in the cloud. Service application 120 may include a video machine learning (ML) model 122, which performs video analytics using machine learning technologies, such as neural networks, to identify portions of video streams associated with PII. Service application 120 may further include privacy transformer 124, which transforms the identified portions of a video frame to obscure the PII based on a privacy policy to ensure that the PII is not exposed. While video ML model 122 may be trained to identify portions of video frames that include PII, due to the processing and memory restrictions associated with on-premises edge 110, video ML model 122 may not be trained for more complex video analytics. Video machine learning 142 in the network edge 130 may use memory resources that is more expansive than the memory resources in the edge servers 116 of the on-premises edge 110. In aspects, the service application 140 includes a privacy transformer 144. The privacy transformer 144 transforms identified portions of a video frame to obscure the PII based on a privacy policy to ensure that the PII is not exposed. In aspects, from the perspective of users, network servers 134 at network edge 130 may be less trusted than the edge servers 116 at the on-premises edge 110. A mixed use of locally installed servers and remote cloud virtual servers at the network edge 130 is further removed from users and results in a lower level of trust. While computing and memory resources are more robust in the network servers 134 than in the edge servers 116, the edge servers 116 in the on-premises edge 110 may be more appropriate to process data that is privacy sensitive (e.g., includes personally identifiable information (PII)) than the network servers 134 in the network edge 130.

The cloud 150 is supported by cloud servers 154 and other distributed resources for providing resource-intensive service operations. In aspects, one or more servers in the cloud 150 may be at a central location in a cloud RAN infrastructure. In this case, the central locations may be hundreds of kilometers from the cell towers 102A-C. In aspects, the cloud 150 includes service application 160 for performing video analytics. The service application 160 may perform similar processing tasks as a service application 140 in the network edge 130, but may have access to more processing and memory resources in the cloud 150. However, the cloud servers 154, which are even further removed from users, may offer a reduced level of privacy protection for user data.

In aspects, the on-premises edge 110, which is closer to the cell towers 102A-C and to the video cameras 104A-C (or IoT devices) than the cloud 150, may provide real-time processing, such as traffic accident detection, burglary detection, etc., based on video feeds received from video cameras 104A-C. In contrast, the cloud 150, which is the furthest from the cell towers 102A-C and video cameras 104A-C in the cloud RAN infrastructure, may provide processing in a non-real-time manner (e.g., such as training video ML models or performing complex video analytics).

In aspects, a graphics processing unit (GPU) in the edge servers 116 may provide fast bit operations (e.g., processing graphics and video data). For instance, the GPU may execute service applications (e.g., service application 120) to determine inferences based on captured video stream data. For example, a GPU at edge servers 116 may extract and exclude background data associated with scenery and may analyze video frames of a received video stream to determine positions of objects, types of objects, or object counts. The edge servers 116 may further extract regions of interest for performing video analytics.

The service application 120 includes program instructions for processing data according to predetermined data analytics scenarios on edge servers 116. The predetermined analytics may include, for example, executing one or more video ML models 122 to identify portions of a video frame associated with PII based on a privacy policy and/or executing a privacy transformer 124 to transform the identified portions of the video frame to obscure the PII based on the privacy policy to ensure that the PII is not exposed. Video ML model 122 performs video analytics by extracting and identifying objects from video stream data based on trained object scenarios. For example, video ML model 122 may rely on a plurality of trained models to identify different types of objects (e.g., trees, animals, people, automobiles, etc.), a count of objects (e.g., a number of people in a video frame), and/or a particular object (e.g., a particular person based on facial recognition). In aspects, each model may be trained to identify a different type of object.

The incoming video stream may include background data and object data, which the video cameras 104A-C captured and transmitted to the cell towers 102A-C. For example, the service application 120 may analyze the video stream and extract portions of the video stream as regions of interest, which regions of interest may comprise object data as opposed to background data. Once extracted, the regions of interest may be evaluated to recognize objects (e.g., a face of a person), as described above, or the service application may transmit the extracted regions of interest instead of the full video stream to the cloud for further processing (e.g., to identify a person by performing facial recognition on the face of the person). In aspects, the computing and memory resources at the edge servers 116 are not robust enough for performing complex or memory intensive video analytics (e.g., facial recognition for identifying a name of a person), whereas the network servers 134 in the network edge 130 are able to perform such analytics. However, to prevent PII from being exposed at the network edge 130 (which is less trusted), the privacy transformer 124 dynamically selects different technologies based on a privacy policy for performing privacy transformations on video stream data at the on-premises edge 110. For example, technologies for privacy transformations includes reducing resolution of video stream data and/or shading (e.g., masking or redacting) one or more regions in video frames associated with PII (e.g., the face of a person). Through privacy transformations, the on-premises edge 110 prevents private data (e.g., personally identifiable information, a privately owned object, and the like) from being exposed to servers that are less trusted for privacy protection (e.g., network servers 134 and/or cloud servers 154).

As described above, the service application 120 may use one or more models for recognizing and/or predicting objects when performing data analytics of video stream data. Respective models may be fine-tuned for performing distinct functions. For example, a model may accurately recognize faces of people and determine regions within video frames that correspond to the recognized faces. Another model may be fined tuned for recognizing automobiles (including particular automobile makes or models) that appear in the video frames. Some other model may be fine-tuned for recognizing and extracting voices of distinct people from audio data. In aspects, the service application 120 may use the one or more models for identifying objects associated with private data and transforming the video stream data to protect privacy. For example, when video analytics has the ultimate goal of counting a number of people under predetermined conditions in the captured video, the service application 120 may use the one or more video ML models 122 to recognize people as objects in the captured video and may perform privacy transformations by enhancing outlines of the objects (to facilitate counting) while shading inside and outside the outlines (to obscure recognition of the objects as particular individuals). By transmitting the transformed video stream data to the network edge 130, and not the original video stream, the disclosed technology prevents exposing PII data to the less trusted network edge 130.

The service application 140 in the network edge 130 has more computational and memory resources to perform video processing that is more resource intensive and complex than the service application 120 at the on-premises edge 110. Accordingly, the service application 140 may perform video analytics that are more sophisticated (e.g., analyzing video frames to determine a number of people who are sitting in the video frames, changes in a number of people who are sitting over time, and identifying individuals,) than performed by the service application 120. That is, in addition to recognizing objects as people, service application 140 may be trained to recognize and count people who are in a particular position (e.g., sitting, running), performing a particular action (e.g., walking a dog), wearing clothing of a particular color (e.g., red shirt), and the like. In aspects, video ML model 142 may be trained on larger sets of training data and may require more memory and processing resources to execute.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
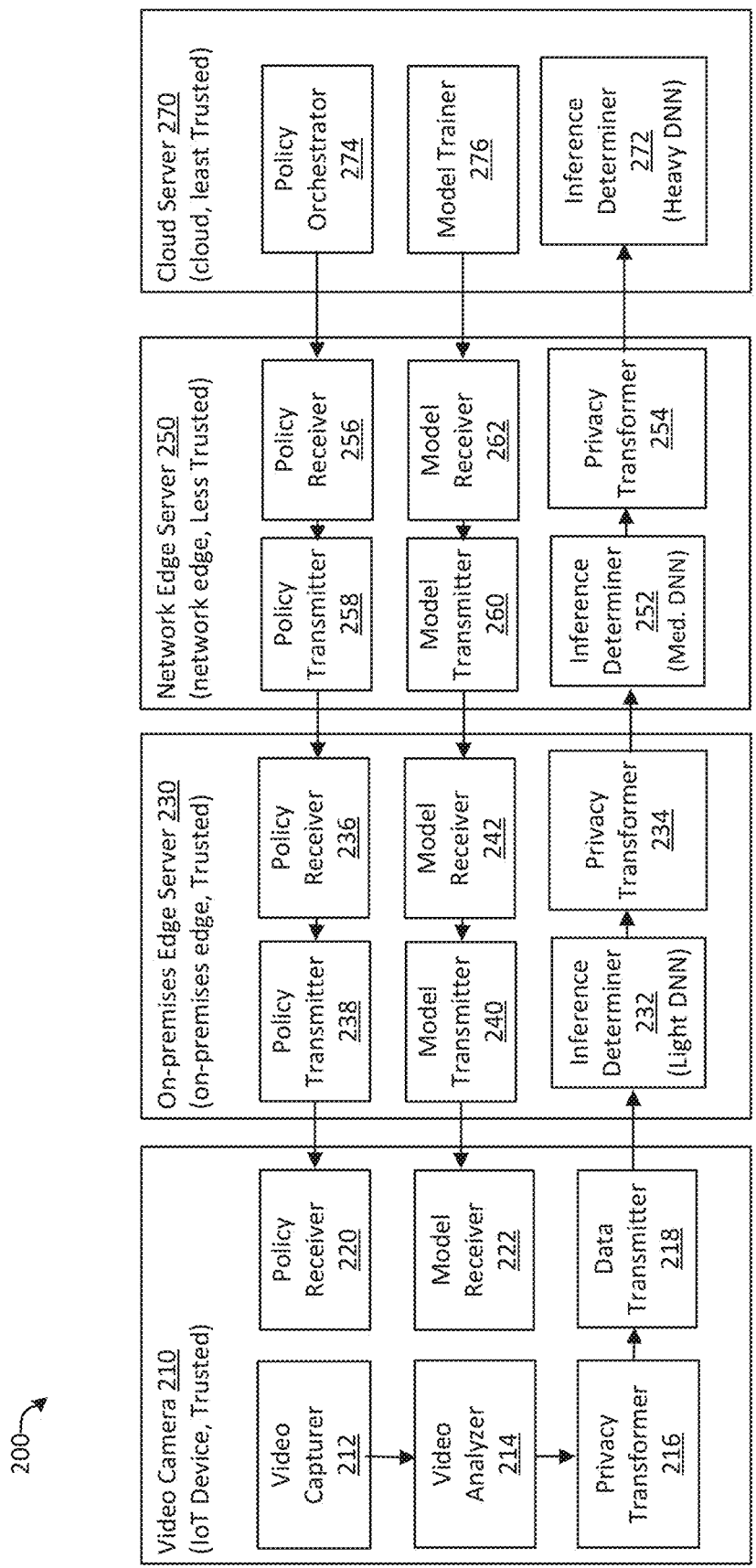
FIG. 2 illustrates an example system for privacy transformations in MEC in accordance with aspects of the present disclosure.

FIG. 2 illustrates an example system for privacy transformation of video stream data in accordance with aspects of the present disclosure. The system 200 includes video camera 210 (IoT device, trusted), on-premises edge server 230

(on-premises edge, trusted), network edge server 250 (network edge, less trusted), and cloud server 270 (cloud, least trusted). In aspects, the video camera 210 captures images and transmits video stream data to the on-premises edge server 230 via a cell tower. The video camera 210 includes video capturer 212, video analyzer 214, privacy transformer 216, data transmitter 218, and policy receiver 220.

In aspects, the video capturer 212 captures video stream data in the field. Examples of the video stream data may involve video surveillance of a location within a view of video camera 210 (e.g., a street, a parking lot, a hallway, etc.), and the captured video stream data may comprise captured objects (e.g., people, automobiles, animals, and the like) passing through the location within the view. The video analyzer 214 analyzes the captured video stream data and may adjust color, brightness, and sharpness, etc., to enhance captured objects. However, an extent of analyzing and processing the captured video stream data by the video camera 210 may be relatively limited because of the minimal computational and memory resources available at the video camera 210. The privacy transformer 216 may transform the captured video stream data by removing private information that may appear in some parts of the captured video. In aspects, performing privacy transformations is computationally intense because transformation includes processing pixels and determining inferences associated with the captured video data. Thus, video camera 210 may perform relatively limited and simple privacy transformations, if at all. The data transmitter 218 transmits original or minimally transformed video stream data to inference determiner 232 (e.g., a Light Deep Neural Network (DNN)) at the on-premises edge server 230.

In aspects, the privacy transformer 216 transforms the captured video stream data based on a privacy policy. The policy receiver 220 receives the privacy policy from the on-premises edge server 230 and/or other servers in the hierarchy of servers in MEC. In some aspects, the privacy policy includes one or more rules and/or instructions that specify one or more technologies (or techniques) that the privacy transformer 216 uses to transform the captured video stream data. In aspects, the privacy transformation takes place before the data transmitter 218 transmits the video stream data to a cell tower, from which it is transmitted to the on-premises edge server 230. For example, for video stream data captured by a fixed camera for video surveillance of a street, video analytics may involve monitoring a volume of traffic on the street by counting a number of cars passing by the fixed camera. Here, minimal processing may be performed by the camera on captured video stream data. As an example, the camera may drop predetermined regions of video frames associated with background scenery, which is outside an area of the fixed view of the street where cars may pass by. In further aspects, where the video surveillance is concerned with a count of cars passing along the street, the privacy transformer 216 may perform rudimentary privacy transformations according to a privacy policy by reducing resolution or masking portions of video frames associated with car windows and/or license plates. In this way, PII associated with faces of particular drivers and/or particular license plate numbers may be obscured to avoid exposure during transmission of the video stream data by data transmitter 218. In some aspects, the one or more rules in the private policy enable selection of a technique for performing a privacy transformation based on computing resources available to transform data. Respective techniques may consume different amounts of computing and memory resources to transform data. In some aspects, available computing and memory resources at the video camera 210 may be insufficient to execute any of the transformation techniques. When an IoT device is unable to perform any of the techniques based on available resources, the privacy transformer 216 passes the data without transformation to the next entity (e.g., on-prem server) in the data analytics pipeline. In some other aspects, rather than transmitting data having PII, the privacy transformer 216 may prevent the data from being transmitted. In this case, the data may be deleted without transmission or stored at the IoT device until computing resources are sufficient for performing privacy transformations on the data.

The inference determiner 232 (light DNN) at the on-premises edge server 230 receives the minimally transformed video steam data from the video camera 210 via a cell tower (e.g., cell towers 102A-C as shown in FIG. 1). In aspects, the inference determiner 232 determines inferences based on the video stream data. The on-premises edge server 230 may comprise more computing and memory resources than video camera 210, but less than the network edge server 250. Accordingly, the inference determiner 232 may use video ML models (e.g., a light version of a deep neural network) to perform inference operations that are more complex than those performed by the video camera 210 and less complex than those performed by the network edge server 250.

The privacy transformer 234 in the on-premises edge server 230 may perform privacy transformations based on the inference operations to remove or obscure personally identifiable information (PII). For example, the privacy transformer 234 may remove PII from video steam data by reducing image resolution and/or masking regions of video frames to remove details needed to recognize portions within regions of interest in video frames. By reducing resolution and/or masking, faces of people within the video frames may not be recognizable, but the transformed video stream data may be sufficient to recognize objects as people and determine a number of people in a video frame, for example.

The inference determiner 252 at the network edge server 250 receives video steam data from the on-premises edge server 230. In aspects, the network edge server 250 may include a combination of locally-installed servers for meeting near real-time processing requirements and cloud-based, virtual servers associated with robust distributed resources in the cloud. Accordingly, the inference determiner 252 (e.g., executing a medium level of deep neural network) may be capable of performing object recognition and inference determination with more complexity and accuracy than the inference determiner 232. Privacy transformer 254 may transform output from the inference determiner 252 (e.g., recognized objects associated with PII) to remove the PII and other information that is privacy sensitive. Similar to the privacy transformer 216 of the video camera 210 and the privacy transformer 234 at the on-premises edge server 230, the privacy transformer 254 uses a privacy policy to dynamically select a technique for transforming the video stream data, such as extraction, masking, reducing resolution, etc. The privacy transformer 264 transmits the transformed video stream data to the inference determiner 272 in the cloud server 270.

In aspects, the cloud server 270 provides the most abundant resources as compared to the resources in the video camera 210, the on-premises edge server 230, and the network edge server 250. Accordingly, the inference determiner 272 uses a heavy (e.g., a large scale) deep neural network to generate inferences from the video steam data.

The cloud server may also include a policy orchestrator 274. The policy orchestrator 274 maintains consistency of the privacy policy across the system. The policy orchestrator 274 transmits the privacy policy to the various servers across the video analytics pipeline from the video camera 210 to the cloud server 270. The policy orchestrator 274 transmits a privacy policy to the policy receiver 256 of the network edge server 250. The policy receiver 256 installs a privacy policy for use by privacy transformer 254 to protect PII in video data streams at the network edge server 250. The policy transmitter 258 transmits the privacy policy to the policy receiver 236 in the on-premises edge server 230. The policy receiver 236 stores the privacy policy for use by privacy transformer 234 to protect PII in video data streams at the on-premises edge server 230. The policy transmitter 238 transmits the privacy policy to the policy receiver 220 for use by privacy transformer 216 to protect PII associated with captured video stream data at the video camera 210. In aspects, the cloud server includes model trainer 276. The model trainer 276 trains models used in respective servers while complying with the privacy policy. The model trainer 276 trains and transmits trained models to the model receiver 262 at the network edge server 250. The model transmitter 260 transmits models for on-premises edge server 230 and the video camera 210 to the model receiver 242 at the on-premises edge server 230. The model receiver 242 at the on-premises edge server 230 receives the trained models. The model transmitter 240 transmits a trained model for the video camera 210. The model receiver 222 receives the trained model and stores the trained model for use by the privacy transformer 216. The privacy transformer 234 uses the model stored in the on-premises edge server 230. The inference determiner 252 uses the model stored in the network edge server 250.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

FIGS. 3A-D illustrate examples of images associated with privacy transformations in accordance with the aspects of the present disclosure. FIG. 3A illustrates an example of an image 300A. In aspects, the image is a video frame of video stream data as captured by a video camera (e.g., the video camera 104A as shown in FIG. 1). For example, the image includes three people 302A-C and one of them (person 302C) is looking toward the camera (e.g., front facing). In some aspects, the image depicts person 302C in sufficient detail for a facial-recognition video machine learning model to recognize and identify an individual associated with the depicted face by name.

FIG. 3B illustrates the example image 300B following a privacy transformation. In aspects, the privacy transformation includes a reduction in image resolution (e.g., a number of pixels in the image). Reducing the resolution of the image may remove some of details of the original image. For example, FIG. 3B depicts a face of person 302C more coarsely than FIG. 3A. The reduced resolution may make difficult if not impossible to perform facial recognition to identify a particular individual based on the transformed image. Accordingly, the transformed image in FIG. 3B may prevent exposing PII (e.g., name) of person 302C appearing in the image. In aspects, the privacy transformer 234 in the on-premises edge server 230 may generate the image as shown in FIG. 3B based on the captured video frame shown in FIG. 3A. In some aspects, the privacy transformation includes degrading a resolution of an entire video frame. In some other aspects, the privacy transformation includes degrading a resolution of regions that indicate types of objects being recognized (e.g., a person, a head, a face, and the like) in the captured video frame. In aspects, privacy policies (i.e., privacy instructions) specify one or more techniques for performing privacy transformations. In some aspects, the privacy policies may include one or more rules for selection of a technique from one or more techniques (i.e., programs) for converting or transforming data to protect privacy in the data. For example, the one or more techniques may include masking, obscuring, dropping, or otherwise transforming data to prevent exposure of PII.

FIG. 3C illustrates an example image 300C after a privacy transformation in accordance with aspects of the present disclosure. In this case, the privacy transformation masks various portions of an image (or a video frame) to hide regions outside of a region of interest. For example, where video analytics are directed to identifying a number of front-facing people (e.g., a number of people looking towards the camera), people who are not front facing can be masked to reduce an amount of video stream data to be analyzed. When portions of an image are excluded or masked, processing the image to detect an object of interest requires less processing and memory. In this way, a video camera and/or on-premises edge server may have sufficient computing resources to perform the video analytics without transmitting the video stream to network or cloud servers, which could expose PII during or after the transmission. That is, the video camera and/or on-premises edge server may be able to recognize an object as a person and to detect that the person is looking toward the camera (e.g., front facing)—even following a reduction in resolution to prevent facial recognition.

FIG. 3D illustrates another example of data 300D after a privacy transformation. In aspects, the privacy transformation may determine one or more inferences based on the image data and, rather than transmitting video stream data may transmit the inferred output data. For example, video analytics may be performed on an image to identify objects as people (e.g., people 302A-C) and to detect people looking toward the camera (e.g., person 302C). The video analytics may further determine a number of people who are looking toward the camera (e.g., one front-facing person 302C) and may generate text string data 300D: "[A] number of front-facing people=1." In the example, the transformed data is not image data but a text or code that provides an output or result of video analytics. By transmitting the text or code without the image or video stream data, upstream servers do not receive image data that may include personally identifiable information (PII). In aspects, the privacy transformation uses non-photorealistic data (e.g., text data) to reduce exposing PII that may be extracted or inferred from the original image data. While the example of data 300D illustrates the most protective privacy transformation, generating the text data based on determining inferences from image data may be more computing resource intensive than reducing resolution or masking regions of the image.

FIG. 4 illustrates an example system for privacy transformation in MEC in accordance with aspects of the present disclosure. The system 400 includes pixel-based transformer 402, non-photorealistic data transformer 404, and a deep data analyzer 406. In aspects, the pixel-based transformer 402 is either at the IoT device (e.g., the video camera 104A as shown in FIG. 1) or at the on-premises edge (e.g., the edge servers 116 in the on-premises edge 110 as shown in FIG. 1). For example, the pixel-based transformer performs pixel-by-pixel operations on image data or video frames for background subtraction, object position analysis, and/or region of interest extraction.

The non-photorealistic data transformer 404 transforms photorealistic image data into data with a non-photorealistic rendering (e.g., shading with less color and gradient, data visualization, neural style transfer, and the like) for protecting data privacy. In aspects, the non-photorealistic transformation is resource-intensive because inference processing is required. Accordingly, the non-photorealistic data transformer 404 may reside in servers with available computing resources downstream in the data analytics pipeline (e.g., the on-premises edge, the network edge, and/or the cloud). In some aspects, the non-photorealistic transformation includes object recognition and an object counter to generate video analytics output.

The deep data analyzer 406 analyzes data (e.g., captured image data) to generate extensive inferences from image data. In aspects, the deep data analyzer 406 is in the cloud (e.g., the cloud servers 154 in the cloud 150 as shown in FIG. 1). The deep data analyzer 406 may use a large-scale deep neural network, for example. While the cloud 150 may provide sufficient resources for the deep data analyzer 406 to determine inferences with accuracy, the cloud 150 may be the least trustworthy in protecting data privacy in MEC. Accordingly, a level of data privacy protection 408 may be the lowest at the deep data analyzer 406 and may be the highest at the pixel-based transformer 402. That is, the level of localized trustworthiness in MEC may be the lowest in the cloud and the highest at the IoT devices and the on-premises edge.

FIG. 5 illustrates an example of a method for private transformation of data analytics in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, 6, 7, and 8A-B.

Following start operation 502, the method 500 begins with receive operation 504, in which a privacy instruction (i.e., a privacy policy) is received by an edge server. In aspects, the edge server may be a server in an on-premises edge or in a network edge. In some other aspects, the method 500 may take place in an IoT device (e.g., a video camera). The privacy instruction may include one or more selections of methods or techniques used to perform privacy transformations of data such as video stream data. While privacy transformations may impact the accuracy of data analytics to an extent, the data analytics may still provide meaningful results through inference generation, for instance.

Receive operation 506 receives captured data. The captured data may include, but is not limited to, video stream data, still image data, audio data, text data, and a combination thereof. In aspects, the receive operation 506 receives the captured video data from a video camera (e.g., the video cameras 104A-C as shown in FIG. 1). Additionally or alternatively, the edge server may store the privacy policy in the edge server and retrieve the privacy policy.

Evaluate operation 508 detects and determines background data of the captured data as a part of initial image processing according to the data analytics pipeline. For example, the evaluate operation 508 may detect background and foreground data (or one or more regions of interest) in image data. The image data may include one or more video frames of the captured video data. In some aspects, the evaluate operation 508 may further recognize and determine types of objects and respective positions of the objects. The evaluate operation 508 may include recognizing various types of objects and regions of interests for data analytics. For example, the evaluate operation 508 may determine regions including people and faces as objects.

Select operation 510 selects a technique (e.g., program instructions) for performing a privacy transformation. For example, a technique may include reducing a resolution of data (e.g., image pixel data and/or video frames), masking at least a part of the image data of video frames, and/or extracting data associated with an area of interest and discarding additional data. In aspects, the select operation 510 selects a technique according to the privacy policy. In some other aspects, the select operation 510 selects a technique based on free workload available in the edge server. In aspects, the select operation 510 dynamically selects the technique based on a combination of instructions in the privacy policy and an available workload in the edge server. Additionally or alternatively, the select operation 510 selects a technique for performing a privacy transformation based on computing resources that are available at the edge server. In aspects, the edge server processes the live data stream while executing programs for privacy transformation.

Generate operation 512 generates position data of objects based on the determined regions of interests associated with the image data. The object position data indicates positions of objects (e.g., people and automobiles) in the image data.

Alter operation 514 alters the data by transforming at least some of the data according to the selected technique for privacy protection. In aspects, the transform operation 514 transforms the captured image and/or video stream data by degrading accuracy or details of data that is subject to privacy protection. For example, the transform operation 514 may reduce resolution of an image or a video frame to the extent that details of objects associated with PII (e.g., a face of a person, a name of a person, a license plate number of a vehicle, a street address) cannot be recognized when the transformed data is transmitted to a less trustworthy entity within the video analytics pipeline.

Transmit operation 516 transmits the transformed data. For example, the on-premises edge server may transmit the transformed image or video steam data to a network edge server for further video analytics processing, or a network edge server may transmit transformed image or video stream data to a cloud server for further video analytics processing. The method 500 ends with the end operation 518.

As should be appreciated, operations 502-518 are described for purposes of illustrating the present methods and systems and are not intended to limit the disclosure to a particular sequence of steps, e.g., steps may be performed in different order, additional steps may be performed, and disclosed steps may be excluded without departing from the present disclosure. The operations 502-518 may be performed not only by the on-premises edge server but also by a server in a hierarchy of servers with varying levels of trust and computing resource availability.

FIG. 6 is an example of a method for privacy transformation in video analytics in accordance with aspects of the present disclosure. A general order of the operations for the method 600 is shown in FIG. 6. Generally, the method 600 begins with start operation 602 and ends with end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5, 7, and 8A-B.

Following start operation 602, the method 600 begins with retrieve operation 604, in which a privacy policy is retrieved by the edge server. The edge server may include processors and various accelerators to execute service applications. For example, the edge server may include a CPU and an accelerator such as a GPU. In aspects, the privacy policy specifies one or more techniques for transforming captured data (e.g., video stream data, audio data, and other sensory data) for the purpose of protecting privacy.

Select operation 606 dynamically selects a technique to be used for performing privacy transformations on data at the edge server and/or IoT devices (e.g., a video camera, a still camera, a sound recorder, a heat sensing device, and the like). In aspects, the select operation 606 selects a technology based on a combination of instructions by the privacy policy and available resources at the edge server to perform the privacy transformations. For example, based on the privacy policy and available resources on the edge server, the select operation 606 may dynamically select a technique of masking (i.e., filling) a region of a license plate of automobiles appearing in the captured data. In aspects, object recognition may be employed to identify an automobile and further object recognition may be performed to identify a license plate of the automobile. If a license plate is recognized, the technique for performing a privacy transformation may be applied to the license plate (e.g., masking).

Update operation 608 updates one or more models for use of a video machine learning model and for performing privacy transformations on objects associated with PII. In aspects, the one or more models may be specific for inferring predetermined types of objects from the image data (e.g., recognizing faces in video stream data).

Transmit operation 610 transmits a privacy policy to one or more IoT devices (e.g., the video cameras 104A-C as shown in FIG. 1). In aspects, the IoT devices use the privacy policy to process captured image or video data according to the privacy policy and to the extent where computing and memory resources are available in the respective IoT devices.

Receive operation 612 receives, by the edge server, image or video stream data that has been transformed based on the privacy policy by an IoT device. For example, the IoT device may have masked one or more regions of the image or the video frame to protect privacy of objects depicted in the captured image and/or video frame.

Determine operation 614 determines inferences on the received privacy-transformed data. For example, the determine operation 614 may identify predetermined objects (e.g., people and/or automobiles) in the privacy-transformed image data and determine positions of respective objects in the image or a video frame. In some examples, recognized objects may be associated with PII, such as a face of a person or a license plate of an automobile. For example, when an automobile is recognized, the determine operation 614 may recognize a position of a license plate of the automobile. In some cases, an automobile may be recognized but a license plate may not be visible, e.g., with an image captures a side view of the automobile. In this case, object recognition does not identify a license plate associated with the automobile and a privacy transformation may not be performed.

Transform operation 616 transforms the inferred data for privacy protection. In aspects, the transform operation 616 uses a technique that has been dynamically selected based on the privacy policy to transform the image and/or video frame to remove private information. For example, the transform operation 616 may transform the received (captured) image and/or the video frame by masking a region that correspond to the license place of the automobile with a predetermined color. By masking the region of the captured image and/or the video frame, the edge server protects a license number of the automobile from being exposed to servers that are higher (and less trusted) in the MEC hierarchy. The privacy transformation is not limited to video data in video analytics. In some other aspects, the transform operation 616 may modify pitch and other characteristics of audio data to reduce risk of exposing an identity of a speaker in an audio analytics pipeline from the IoT device to the cloud through the on-premises edge server in MEC.

Transmit operation 618 transmits the transformed data to an upstream server (e.g., the network edge server in the network edge in MEC) for further data analytics.

As should be appreciated, operations 602-620 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a policy receiver 722, a data receiver 724, an inference determiner 726, a privacy data transformer 728, and data transmitter 730 as described in more detail with regard to FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the on-premises edge in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the edge servers 116 and the network servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for performing privacy transformations of data to protect privacy in data analytics by a first server at a first level of trust to one or more sensing devices. The method comprises receive, by the first server, a privacy policy, wherein the privacy policy includes one or more techniques for transforming data for privacy protection; receive data, wherein the data includes data captured by the one or more sensing devices; evaluate the data to recognize at least one portion of data that is associated with personal identifiable information; select, based on a combination of the received privacy policy and available resources at the first server, a technique of the one or more techniques for performing a privacy transformation; alter the data by transforming the at least one portion of data using the selected technique, wherein the transformation of the at least one portion of data prevents exposure of the personal identifiable information; and transmit the altered data including the at least one transformed portion of data to a second server, wherein the second server is in a second level of trust lower than the first level of trust. The data is video stream data, and wherein the one or more sensing devices include a video camera, and wherein the first and second servers collectively form a video analytics pipeline with descending levels of privacy protection for the data. The technique for transforming data for privacy protection includes one or more of: masking the portion of data, or modifying one or more characteristics of the portion of data. The one or more characteristics include one of a resolution of image data or a pitch of sound data. The first server is an edge server at an on-premises edge and the second server is one of a server at a network edge or a server in a cloud of a multi-access edge computing hierarchy. The method further comprises causing the second server to select a non-photorealistic technique to transform the transmitted data for further protecting privacy of the transmitted data. The method further comprises identifying, based on determining inferences using a machine learning model, the portion of data as a region of interest; and evaluating the region of interest to recognize one or more predetermined objects. The method further comprises transmitting the privacy instructions to the one or more sensing devices over a wireless network. The performing the privacy transformation includes one or more of: masking a face of a person, masking a license plate of an automobile, and reducing a resolution of image data, wherein the image data enables recognizing an object as a person while preventing facial recognition.

Another aspect of the technology relates to a system for performing privacy transformations of data to protect privacy in data analytics by a first server at a first level of trust to one or more sensing devices. The system comprises a processor; and a memory storing computer-executable instructions that when executed by the processor cause the system to: receive, by the first server, a privacy policy, wherein the privacy policy includes one or more techniques for transforming data for privacy protection; receive data, wherein the data includes data captured by the one or more sensing devices; evaluate the data to recognize at least one portion of object that is associated with personal identifiable information; select, based on a combination of the received privacy policy and available resources at the first server, a technique of the one or more techniques for performing a privacy transformation; alter the data by transforming the at least one portion of object using the selected technique, wherein the transformation of the at least one portion of object prevents exposure of the personal identifiable information; and transmit the altered data including the at least one transformed portion of object to a second server, wherein the second server is in a second level of trust lower than the first level of trust. The data is video stream data, and wherein the one or more sensing devices include a video camera, and wherein the first and second servers collectively form a video analytics pipeline with descending levels of privacy protection for the data. The technique for transforming data for privacy protection includes one or more of: masking the portion of data, or modifying one or more characteristics of the portion of object. The one or more characteristics include one of a resolution of image data or a pitch of sound data. The first server is an edge server at an on-premises edge and the second server is one of a server at a network edge or a server in a cloud of a multi-access edge computing hierarchy. The computer-executable instructions when executed further cause the system to cause the second server to select a non-photorealistic technique to transform the transmitted data for further protecting privacy of the transmitted data. The computer-executable instructions when executed further cause the system to: identify, based on determining inferences using a machine learning model, the portion of data as a region of interest; and evaluate the region of interest to recognize one or more predetermined objects. The performing the privacy transformation includes one or more of: masking a face of a person, masking a license plate of an automobile, and reducing a resolution of image data, herein the image data enables recognizing an object as a person while preventing facial recognition.

In still further aspects, the technology relate to a computer-readable recording medium storing computer-executable instructions for performing privacy transformations of data to protect privacy in data analytics by a first server at a first level of trust to one or more sensing device, the computer-executable instructions that when executed by a processor cause a computer system to receive, by the first server, a privacy policy, wherein the privacy policy includes one or more techniques for transforming data for privacy protection; receive data, wherein the data includes video stream data captured by a video camera; evaluate the video stream data to recognize at least one portion of an object, wherein the recognized object is associated with personally identifiable information; select, based on a combination of the received privacy policy and available resources at the first server, a technique of the one or more techniques for performing a privacy transformation; alter the data by transforming the at least one portion of object prevents exposure of the personal identifiable information; and transmit the altered data including the at least one transformed portion of object in the video stream data to a second server, wherein the second server is in a second level of trust lower than the first level of trust. The first and second servers collectively form a video analytics pipeline with descending levels of privacy protection for the video stream data. The first server is an edge server at an on-premises edge and the second server is one of a server at a network edge or a server in a cloud of a multi-access edge computing hierarchy.

Any of the one or more above aspects in combination with any other of the one or more aspect. Any of the one or more aspects as described herein.

What is claimed is:

1. A computer-implemented method for altering data for privacy protection in a data analytics pipeline, the method comprising:
   receiving, by a first server in the data analytics pipeline, privacy policy information, wherein the privacy policy information describes one or more techniques for transforming data for privacy protection;
   receiving data captured by a sensing device;
   identifying at least a portion of the data as personal identifiable information as described in the privacy policy information;
   selecting, based on a combination of the received privacy policy information and computational resources available in the first server, a technique from the one or more techniques to be used for altering the data for increasing a level of data privacy, wherein the technique describes reducing a resolution of image data corresponding to at least a part of the portion of the data for further processing the data in an increased level of data privacy by a second server in a subsequent step of the data analytics pipeline;
   altering, by the first server, at least a part of the portion of the data using the selected technique; and
   transmitting, by the first server, the altered data in the increased level of data privacy to the second server of the data analytics pipeline.

2. The computer-implemented method of claim 1, wherein the data is video stream data, and wherein the sensing device includes a video camera, and wherein the first and second servers collectively form a video analytics pipeline with descending levels of privacy protection of the data in video form.

3. The computer-implemented method of claim 1, wherein the technique includes at least one of:
removing the portion of the data,
masking the portion of the data, or
modifying one or more characteristics of the portion of the data.

4. The computer-implemented method of claim 3, wherein the one or more characteristics include either one of a resolution of image data or a pitch of sound data.

5. The computer-implemented method of claim 1, wherein the first server is an edge server at an on-premises edge and the second server is either one of a server at a network edge or a server in a cloud of a multi-access edge computing hierarchy.

6. The computer-implemented method of claim 1, the method further comprising:
causing the second server to select a non-photorealistic technique to transform the transmitted data for further protecting privacy of the transmitted data, wherein the non-photorealistic technique includes generating textual data from the altered data by determining inferences of the altered data.

7. The computer-implemented method of claim 1, the method further comprising:
identifying, based on determining inferences using a machine learning model, the portion of that data as a region of interest; and
evaluating the region of interest to recognize one or more predetermined objects.

8. The computer-implemented method of claim 1, the method further comprising:
transmitting the privacy policy information to the sensing device over a wireless network, wherein the sensing device stores the data in a memory of the sensing device without transmitting the data to the first server until the sensing device has sufficient computing resources for performing privacy transformation of the data according to the privacy policy information.

9. The computer-implemented method of claim 1, wherein the technique describes includes at least one of:
masking a face of a person,
masking a license plate of an automobile, or
reducing a resolution of image data, wherein the image data enables recognizing an object as a person while preventing facial recognition.

10. A system for performing privacy transformations of data to protect privacy of the data in a data analytics pipeline using servers, the system comprising:
a processor; and
a memory storing computer-executable instructions that when executed by the processor cause the system to execute operations comprising:
receiving, by a first server in the data analytics pipeline, privacy policy information, wherein the privacy policy information describes one or more techniques for transforming data for privacy protection;
receiving data captured by a sensing device;
identifying at least a portion of the data as personal identifiable information as described in the privacy policy information;
selecting, based on a combination of the received privacy policy information and computational resources available in the first server, a technique from the one or more techniques to be used for altering the data for increasing a level of data privacy, wherein the technique describes reducing a resolution of image data corresponding to at least a part of the portion of the data for further processing the data in an increased level of data privacy by a second server in a subsequent step of the data analytics pipeline;
altering, by the first server, at least a part of the portion of the data using the selected technique; and
transmitting, by the first server, the altered data in the increased level of data privacy to the second server of the data analytics pipeline.

11. The system of claim 10, wherein the data is video stream data, and wherein the sensing device includes a video camera, and wherein the first and second servers collectively form a video analytics pipeline with descending levels of privacy protection for the data in video form, and the sensing device stores the data in a memory of the sensing device without transmitting the data to the first server until the sensing device has sufficient computing resources for performing privacy transformation of the data according to the privacy policy information.

12. The system of claim 10, wherein the technique includes at least one of:
removing the portion of the data,
masking the portion of the data, or
modifying one or more characteristics of the portion of the data.

13. The system of claim 12, wherein the one or more characteristics include either one of a resolution of image data or a pitch of sound data.

14. The system of claim 10, wherein the first server is an edge server at an on-premises edge and the second server is either one of a server at a network edge or a server in a cloud of a multi-access edge computing hierarchy.

15. The system of claim 10, the computer-executable instructions when executed further cause the system to:
causing the second server to select a non-photorealistic technique to transform the transmitted data for further protecting privacy of the transmitted data, wherein the non-photorealistic technique includes generating textual data from the altered data by determining inferences of the altered data.

16. The system of claim 10, the computer-executable instructions when executed further cause the system to:
identifying, based on determining inferences using a machine learning model, the portion of that data as a region of interest; and
evaluating the region of interest to recognize one or more predetermined objects.

17. The system of claim 10, wherein the technique includes at least one of:
masking a face of a person,
masking a license plate of an automobile, or
reducing a resolution of image data, wherein the image data enables recognizing an object as a person while preventing facial recognition.

18. A computer-readable recording medium storing computer-executable instructions for performing transformations of data to protect privacy of the data in a data analytics pipeline using servers, the computer-executable instructions that when executed by a processor cause a computer system to execute operations comprising:
receiving data captured by a sensing device;
identifying at least a portion of the data as personal identifiable information;
selecting, based on a combination of the received privacy policy information and computational resources available in a first server, a technique from one or more techniques to be used for altering the data for increasing a level of data privacy, wherein the technique describes reducing a resolution of image data corresponding to at least a part of the portion of the data for further processing the data in an increased level of data privacy by a second server in a subsequent step of the data analytics pipeline;

altering, by the first server, at least a part of the portion of the data using the selected technique; and transmitting, by the first server, the altered data in the increased level of data privacy to the second server of the data analytics pipeline.

19. The computer-readable recording medium of claim 18, wherein the altering further comprising either removing or masking at least the part of the portion of the data using the selected technique, and wherein the first and second servers collectively form the data analytics pipeline with descending levels of trustworthiness of servers in protecting privacy of the data.

20. The computer-readable recording medium of claim 18, wherein the first server is an edge server at an on-premises edge and the second server is either one of a server at a network edge or a server in a cloud of a multi-access edge computing hierarchy.

* * * * *